US011724637B2

(12) United States Patent
Nagase et al.

(10) Patent No.: US 11,724,637 B2
(45) Date of Patent: Aug. 15, 2023

(54) VEHICLE OPENING AND CLOSING BODY CONTROL DEVICE THAT SENSES GESTURES

(71) Applicant: AISIN CORPORATION, Kariya (JP)

(72) Inventors: Koji Nagase, Kariya (JP); Takuya Tamura, Kariya (JP)

(73) Assignee: AISIN CORPORATION, Kariya (JP)

( * ) Notice: Subject to any disclaimer, the term of this patent is extended or adjusted under 35 U.S.C. 154(b) by 0 days.

(21) Appl. No.: 17/582,634

(22) Filed: Jan. 24, 2022

(65) Prior Publication Data

US 2022/0258663 A1 Aug. 18, 2022

(30) Foreign Application Priority Data

Feb. 17, 2021 (JP) .................................. 2021-023488

(51) Int. Cl.
| | |
|---|---|
| *B60Q 1/00* | (2006.01) |
| *B60Q 1/22* | (2006.01) |
| *B60Q 1/34* | (2006.01) |
| *B60R 25/20* | (2013.01) |
| *B60R 25/24* | (2013.01) |
| *B60Q 1/50* | (2006.01) |

(52) U.S. Cl.
CPC .............. *B60Q 1/0023* (2013.01); *B60Q 1/22* (2013.01); *B60Q 1/346* (2013.01); *B60Q 1/50* (2013.01); *B60R 25/2054* (2013.01); *B60R 25/246* (2013.01); *B60Q 2400/40* (2013.01); *B60Q 2400/50* (2013.01)

(58) Field of Classification Search
CPC ......................... B60Q 1/0023; B60R 25/2045
See application file for complete search history.

(56) References Cited

U.S. PATENT DOCUMENTS

| | | | | |
|---|---|---|---|---|
| 9,616,802 B1* | 4/2017 | Kiriyama | ............... | B60Q 1/346 |
| 10,176,368 B1* | 1/2019 | Ramakrishnan | ........ | E05F 15/77 |
| 2015/0197180 A1* | 7/2015 | Salter | ..................... | F21S 43/16 |
| | | | | 362/510 |

(Continued)

FOREIGN PATENT DOCUMENTS

| | | |
|---|---|---|
| JP | 2006-213206 A | 8/2006 |
| JP | 2016-196798 A | 11/2016 |

(Continued)

*Primary Examiner* — Robert J May
(74) *Attorney, Agent, or Firm* — Oblon, McClelland, Maier & Neustadt, L.L.P.

(57) ABSTRACT

An opening and closing body control device is applied to a vehicle that includes a vehicle body having an opening, an opening and closing body configured to open and close the opening, a drive unit configured to operate the opening and closing body, and a detection device configured to detect a gesture operation of a user. The opening and closing body control device includes: a position acquisition unit configured to acquire a position of a portable device carried by the user by wireless communication; an operation determination unit configured to determine whether the gesture operation is executed in a situation where the portable device is present in a detection area of the detection device; and an opening and closing body control unit configured to operate the opening and closing body based on a content of the gesture operation when it is determined that the user executes the gesture operation.

6 Claims, 5 Drawing Sheets

(56) References Cited

U.S. PATENT DOCUMENTS

| | | |
|---|---|---|
| 2016/0281410 A1 | 9/2016 | Schanz et al. |
| 2017/0120798 A1 | 5/2017 | Kiriyama et al. |
| 2017/0182933 A1 | 6/2017 | Kiriyama et al. |
| 2018/0361992 A1 | 12/2018 | Takagi |

FOREIGN PATENT DOCUMENTS

| | | |
|---|---|---|
| JP | 2018-531332 A | 10/2018 |
| JP | 2019-148157 A | 9/2019 |
| JP | 6606128 B2 | 11/2019 |

\* cited by examiner

VEHICLE OPENING AND CLOSING BODY CONTROL DEVICE THAT SENSES GESTURES

CROSS REFERENCE TO RELATED APPLICATIONS

This application is based on and claims priority under 35 U.S.C. § 119 to Japanese Patent Application 2021-023488, filed on Feb. 17, 2021, the entire content of which is incorporated herein by reference.

TECHNICAL FIELD

This disclosure relates to an opening and closing body control device.

BACKGROUND DISCUSSION

JP 2006-213206A (Reference 1) discloses, as an example of an opening and closing body control device, a window sensor for a vehicle including a sensor electrode provided on a window glass of the vehicle, and an electrostatic capacitance detection circuit that detects an electrostatic capacitance between the sensor electrode and a vehicle body. The window sensor for a vehicle unlocks the door or opens the door when a user brings his/her hand into contact with the window glass, in other words, when an operation of the user is detected.

The window sensor for a vehicle as described above has room for improvement in view of preventing the door from being erroneously operated.

SUMMARY

An opening and closing body control device is applied to a vehicle that includes a vehicle body having an opening, an opening and closing body configured to open and close the opening, a drive unit configured to operate the opening and closing body, and a detection device configured to detect a gesture operation of a user. The opening and closing body control device includes: a position acquisition unit configured to acquire a position of a portable device carried by the user by wireless communication; an operation determination unit configured to determine whether the gesture operation is executed in a situation where the portable device is present in a detection area of the detection device; and an opening and closing body control unit configured to operate the opening and closing body based on a content of the gesture operation when it is determined that the user executes the gesture operation.

BRIEF DESCRIPTION OF THE DRAWINGS

The foregoing and additional features and characteristics of this disclosure will become more apparent from the following detailed description considered with the reference to the accompanying drawings, wherein.

DETAILED DESCRIPTION

First Embodiment

A vehicle including an opening and closing body control device (hereinafter, also referred to as a "door control device") according to a first embodiment will be described with reference to the drawings.

Figure 1:
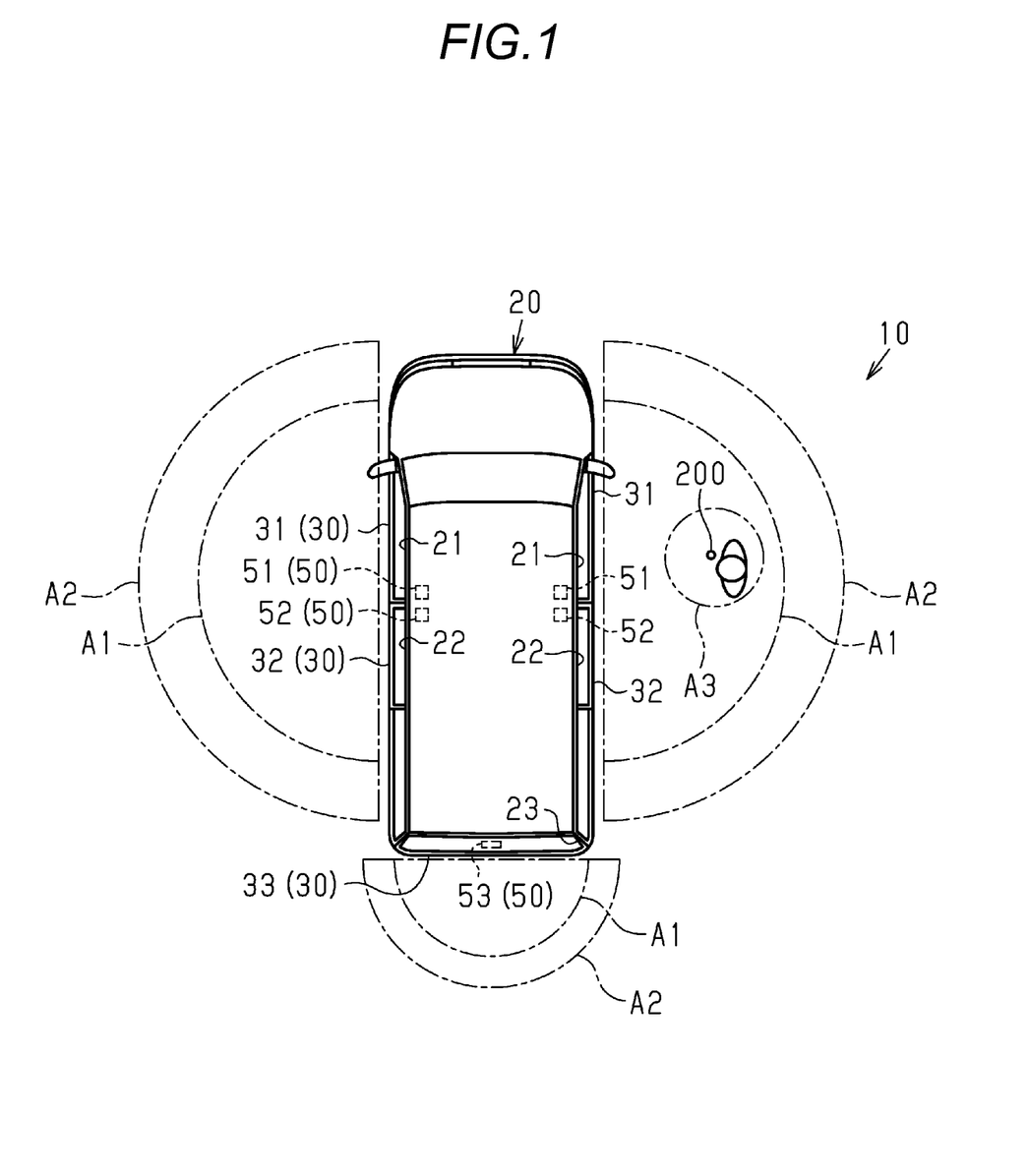
FIG. 1 is a schematic diagram of a vehicle including a door control device according to a first embodiment.
Figure 2:
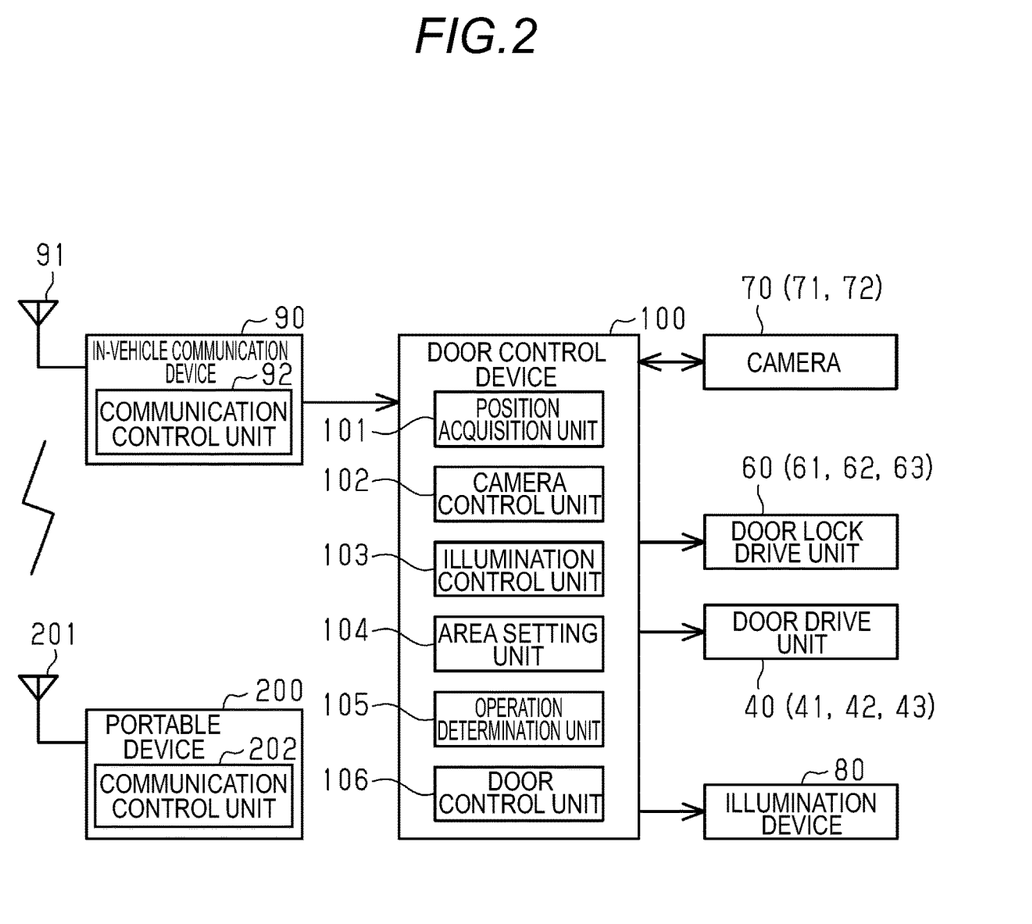
FIG. 2 is a block diagram showing a control configuration of the door control device according to the first embodiment.

As shown in FIGS. 1 and 2, a vehicle 10 includes a vehicle body 20, doors 30, door drive units 40, door lock devices 50, door lock drive units 60, cameras 70, an illumination device 80, an in-vehicle communication device 90, and a door control device 100.

As shown in FIG. 1, the vehicle body 20 includes first openings 21 and second openings 22 that are opened on lateral sides, and a third opening 23 that is opened on a rear side. The first openings 21 are located in front of the second openings 22, respectively. The first openings 21 and the second openings 22 are portions through which a user passes when getting on and off the vehicle 10. The third opening 23 is a portion in which the user puts in and takes out luggage in and from a luggage compartment. Each of the first openings 21, the second openings 22, and the third opening 23 corresponds to an example of an "opening".

The doors 30 include front doors 31 that open and close the first openings 21 respectively, rear doors 32 that open and close the second openings 22 respectively, and a back door 33 that opens and closes the third opening 23. The front door 31 is a swing door whose front end portion is connected to the vehicle body 20 via a hinge (not shown). The front door 31 is displaced between a fully closed position at which the first opening 21 is fully closed and a fully open position at which the first opening 21 is fully opened. The rear door 32 is a slide door supported by a rail (not shown) extending in a front-rear direction. The rear door 32 is displaced between a fully closed position at which the second opening 22 is fully closed and a fully open position at which the second opening 22 is fully opened. The back door 33 is a flip-up door whose upper end portion is connected to the vehicle body 20 via a hinge (not shown). The back door 33 is displaced between a fully closed position at which the third opening 23 is fully closed and a fully open position at which the third opening 23 is fully opened. The door 30 corresponds to an example of an "opening and closing body".

As shown in FIG. 2, the door drive units 40 include a first door drive unit 41 that drives the front doors 31, a second door drive unit 42 that drives the rear doors 32, and a third door drive unit 43 that drives the back door 33. Each of the first door drive unit 41, the second door drive unit 42, and the third door drive unit 43 includes, for example, a motor and a transmission mechanism that transmits a power of the motor to the corresponding doors 30. In the following description, operating the door 30 from the fully closed position to the fully open position is also referred to as an "opening operation", and operating the door 30 from the fully open position to the fully closed position is also referred to as a "closing operation". The door drive unit 40 corresponds to an example of a "drive unit".

As shown in FIG. 1, the door lock devices 50 include first door lock devices 51 that restrain the front doors 31 to the vehicle body 20 respectively, second door lock devices 52 that restrain the rear doors 32 to the vehicle body 20 respectively, and a third door lock device 53 that restrains the back door 33 to the vehicle body 20. The first door lock device 51 is switched between a locked state where the front door 31 located at the fully closed position is restrained to the vehicle body 20 and an unlocked state where the front door 31 located at the fully closed position is not restrained to the vehicle body 20. The second door lock device 52 is switched between a locked state where the rear door 32 located at the fully closed position is restrained to the vehicle body 20 and an unlocked state where the rear door 32 located at the fully closed position is not restrained to the vehicle body 20. The third door lock device 53 is switched between a locked state where the back door 33 located at the fully closed position is restrained to the vehicle body 20 and an unlocked state where the back door 33 located at the fully closed position is not restrained to the vehicle body 20.

As shown in FIG. 2, the door lock drive units 60 include a first door lock drive unit 61 that switches a state of a corresponding one of the first door lock devices 51, a second door lock drive unit 62 that switches a state of a corresponding one of the second door lock device 52, and a third door lock drive unit 63 that switches a state of the third door lock device 53. Each of the door lock drive units 60 includes a motor and a transmission mechanism that transmits a power of the motor to a corresponding one of the door lock devices 50. In the following description, shifting the door lock device 50 from the lock state to the unlock state is also referred to as an unlock operation, and shifting the door lock device 50 from the unlock state to the lock state is also referred to as a lock operation. The door lock drive unit 60 corresponds to an example of the "drive unit".

The cameras 70 include side cameras 71 that each capture an image of an area on the lateral side of the vehicle 10 as an imaging area, and a back camera 72 that captures an image of an area on the rear side of the vehicle 10 as an imaging area. The camera 70 is configured to be adjustable in directions. In other words, the camera 70 can adjust the imaging area by changing a direction. In the following description, as shown in FIG. 1, an area in which an image can be captured by the camera 70 at a present time is also referred to as a "first imaging area A1", and an area in which an image can be captured by the camera 70 by adjusting a direction of the camera 70 is also referred to as a "second imaging area A2". That is, the first imaging area A1 is smaller than the second imaging area A2. The camera 70 corresponds to an example of a "detection device", and the first imaging area A1 corresponds to an example of a "detection area".

In the present embodiment, the side cameras 71 are installed in side mirrors, but in another embodiment, the side cameras 71 may be installed in the front door 31 and the rear door 32 respectively, or may be installed above the first opening 21 and the second opening 22 in the vehicle body 20. In the present embodiment, the back camera 72 is installed in the back door 33, but in another embodiment, the back camera 72 may be installed below the third opening 23 in the vehicle body 20. The camera 70 may be a dedicated camera provided to detect a gesture operation of the user that will be described later, or may be a camera provided to detect surroundings of the vehicle 10. The camera 70 outputs a captured video to the door control device 100.

The illumination device 80 is a light that illuminates the surroundings of the vehicle 10. It is preferable that the illumination device 80 can illuminate at least the imaging area of the side cameras 71 and the imaging area of the back camera 72. In this respect, it is preferable that the illumination device 80 is installed in a vicinity of the side cameras 71 or installed in a vicinity of the back camera 72.

The in-vehicle communication device 90 includes first antennas 91 and a first communication control unit 92. A portable device 200 communicating with the in-vehicle communication device 90 includes second antennas 201 and a second communication control unit 202. The in-vehicle communication device 90 is a communication device that is mounted on the vehicle. The portable device 200 is a communication device carried by the user. That is, the portable device 200 is an electronic key of the vehicle 10, a smartphone, or the like. The portable device 200 may be a wearable device such as a smart watch.

The first antennas 91 include an antenna that transmits a signal in a low frequency (LF) band, an antenna that receives a signal in an ultra high frequency (UHF) band, and an antenna that transmits and receives a signal in an ultra wide band (UWB). It is preferable that two or more first antennas 91 are installed at different locations with respect to the vehicle body 20. The second antennas 201 include an antenna that receives a signal in the LF band, an antenna that transmits a signal in the UHF band, and an antenna that transmits and receives a signal in the UWB band.

The first communication control unit 92 and the second communication control unit 202 mutually authenticate by mutually transmitting and receiving signals. Hereinafter, an authentication method will be briefly described. The first communication control unit 92 transmits, from the first antenna 91 in a predetermined control cycle, a signal in the LF band including information for identifying the in-vehicle communication device 90. Upon receiving the signal in the LF band transmitted from the first antenna 91, the second communication control unit 202 analyzes the signal. When the received signal includes information indicating the in-vehicle communication device 90 that is mounted on the vehicle 10 associated with the portable device 200, the second communication control unit 202 authenticates the in-vehicle communication device 90. After authenticating the in-vehicle communication device 90, the second communication control unit 202 transmits, from the second antenna 201, a signal in the UHF band including information for identifying the portable device 200. Upon receiving the signal in the UHF band transmitted from the second antenna 201, the first communication control unit 92 analyzes the signal. When the received signal includes information indicating the portable device 200 that is associated with the in-vehicle communication device 90, the first communication control unit 92 authenticates the portable device 200. In this manner, the in-vehicle communication device 90 and the portable device 200 mutually authenticate. In the following description, an area at a time when the in-vehicle communication device 90 and the portable device 200 mutually authenticate is also referred to as a "mutual authentication area". In the present embodiment, the mutual authentication area is an area larger than the second imaging area A2.

The first communication control unit 92 also estimates a position of the portable device 200 by mutually transmitting and receiving signals to and from the second communication control unit 202. Hereinafter, a position estimation method will be briefly described. The first communication control unit 92 transmits a signal in the UWB band from the first antenna 91. Subsequently, upon receiving the signal in the UWB band from the first antenna 91, the second communication control unit 202 transmits a signal in the UWB band from the second antenna 201. Thereafter, the first communication control unit 92 receives the signal in the UWB band from the second antenna 201. The first communication control unit 92 transmits and receives the above signals in relation to the plural first antennas 91 installed in the vehicle 10. Finally, the first communication control unit 92 estimates the position of the portable device 200 based on a signal arrival time which is a time taken to transmit and receive the signals and a signal arrival direction which is a direction in which the signal is received.

Hereinafter, the door control device 100 will be described in detail.

As shown in FIG. 2, the door control device 100 includes a position acquisition unit 101, a camera control unit 102, an illumination control unit 103, an area setting unit 104, an operation determination unit 105, and a door control unit 106. In the present embodiment, the door control unit 106 corresponds to an example of an "opening and closing body control unit".

The position acquisition unit 101 acquires the position of the portable device 200 by making the in-vehicle communication device 90 and the portable device 200 mutually communicate. In other words, the position acquisition unit 101 acquires the position of the user carrying the portable device 200 by wireless communication.

The camera control unit 102 adjusts the direction of the camera 70. Specifically, when the portable device 200 is outside the first imaging area A1 and is located in the second imaging area A2, the camera control unit 102 adjusts the direction of the camera 70 such that the portable device 200 falls within the first imaging area A1. Even when the portable device 200 falls within the first imaging area A1, the camera control unit 102 may adjust the direction of the camera 70 such that the portable device 200 is located at a center of the first imaging area A1 when the portable device 200 is located at an end of the first imaging area A1.

The illumination control unit 103 controls on and off of the illumination device 80 in a situation in which the vehicle 10 is stopped and the cameras 70 are activated. Specifically, the illumination control unit 103 turns on the illumination device 80 when the surroundings of the vehicle 10 are dark to such an extent that it is not suitable for the cameras 70 to capture an image, and turns off the illumination device 80 when the surroundings of the vehicle 10 are bright to such an extent that capturing an image by the camera 70 is not affected. For example, the illumination control unit 103 may switch the on and off of the illumination device 80, for example, according to a time zone based on a sunrise time and a sunset time. When the vehicle 10 includes an illuminance sensor, the illumination control unit 103 may switch the on and off of the illumination device 80 based on a detection result of the illuminance sensor.

The area setting unit 104 sets a recognition area A3 narrower than the first imaging area A1 based on the position of the portable device 200. It is preferable that the recognition area A3 is an area including the user carrying the portable device 200. Therefore, the recognition area A3 may be, for example, a circular area whose radius is about 50 cm and whose center is at the position of the portable device 200. In another embodiment, the recognition area A3 may be an elliptical area or a rectangular area.

The operation determination unit 105 determines, based on an image captured by the camera 70, whether the gesture operation set in advance is executed by the user in the recognition area A3. The gesture operation is executed by the user moving a part of his or her body such as a foot and a hand. For example, the gesture operation using the foot of the user is an operation in which the user swings his or her toe around his or her heel. The gesture operation using the hand of the user is an operation in which the user raises his or her hand or shakes his or her hand.

Specifically, the operation determination unit 105 performs a specification process of specifying the part of the body of the user used for the gesture operation, and a determination process of determining whether the specified part of the body of the user executes an operation corresponding to the gesture operation. In the specification process, the operation determination unit 105 may specify the part of the body of the user by using a learned model that has machine-learned. Here, the learned model is obtained by performing machine learning using teacher data in which an image captured in advance and the part of the body of the user are associated with each other. In the determination process, the operation determination unit 105 may determine whether a movement of the specified part of the body of the user matches the gesture operation by using an optical flow.

When the operation determination unit 105 determines that the user executes the gesture operation, the door control unit 106 operates the door 30. Contents of the operation to the door 30 include locking the door 30, unlocking the door 30, closing the door 30, and opening the door 30. The door control unit 106 operates the door 30 when switches provided in a driver seat and the door 30 are operated or when a switch provided in the portable device 200 is operated.

The door control unit 106 determines one of the doors 30 to be operated in accordance with the position of the user who executes the gesture operation. When the user executes the gesture operation in the first imaging area A1 on a right side of the vehicle 10, the door control unit 106 operates one of the front door 31 on the right side and the rear door 32 on the right side. Specifically, the door control unit 106 operates a door closest to the user among the front door 31 on the right side and the rear door 32 on the right side. Similarly, when the user executes the gesture operation in the first imaging area A1 on a left side of the vehicle 10, the door control unit 106 operates one of the front door 31 on the left side and the rear door 32 on the left side. Specifically, the door control unit 106 operates a door closest to the user among the front door 31 on the left side and the rear door 32 on the left side. When the user executes the gesture operation in the first imaging area A1 on the rear side of the vehicle 10, the door control unit 106 operates the back door 33. In this way, when the user executes the gesture operation, the door control unit 106 operates a door closest to the user among the five doors. In the present embodiment, the front door 31 and the rear door 32 correspond to an example of "a first opening and closing body and a second opening and closing body", respectively.

When the user executes the gesture operation, the door control unit 106 may only unlock a specific door or unlock the specific door and open the door. In particular, a user who executes the gesture operation may be present in an operation range of the front door 31 and the back door 33. Therefore, it is preferable that when the portable device 200 is present in the operation range of the front door 31 and the back door 33, the door control unit 106 restricts an operation of the front door 31 and an operation of the back door 33. For example, it is preferable that the door control unit 106 does not open and close the front door 31 and the back door 33 even when the door control unit 106 unlockes the front door 31 and the back door 33.

In another embodiment, the door control unit 106 may determine the one of the doors 30 to be operated according to a content of the gesture operation executed by the user.

The door control unit 106 may limit the one of the doors 30 to be operated to the front door 31 or the rear door 32 when the user executes the gesture operation. Further, the door control unit 106 may be configured such that the user can appropriately set a correspondence relation between the gesture operation, the one of the doors 30 to be operated, and the content of the operation.

Next, a flow of a process performed by the door control device 100 when the user attempts to operate a specific door of the vehicle 10 that is stopped will be described with reference to a flowchart shown in FIG. 3. This process is performed after mutual authentication is completed between the in-vehicle communication device 90 and the portable device 200.

Figure 3:
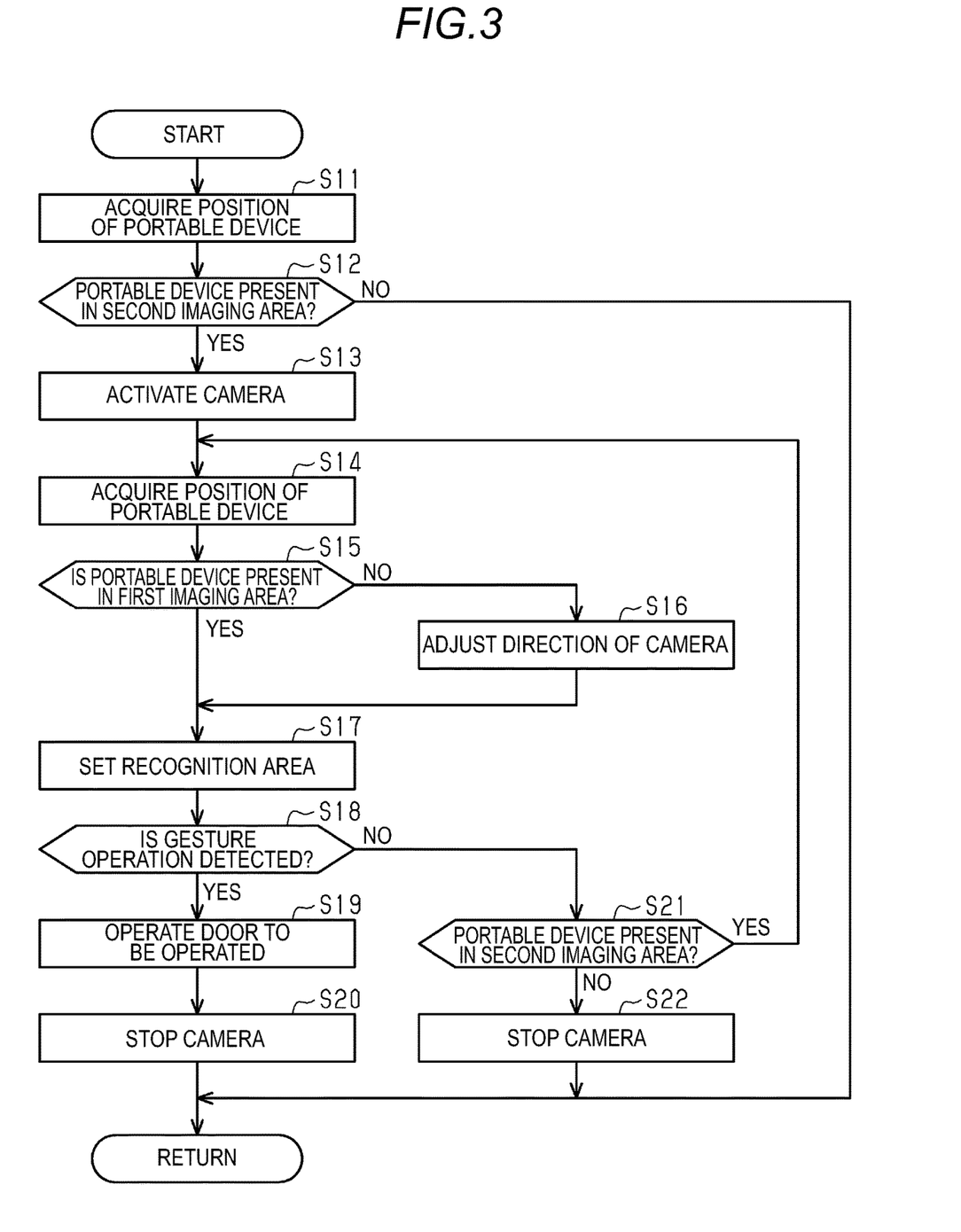
FIG. 3 is a flowchart showing a flow of a process performed by the door control device according to the first embodiment.

As shown in FIG. 3, the door control device 100 acquires the position of the portable device 200 by transmitting and receiving the signals in the UWB band between the in-vehicle communication device 90 and the portable device 200 (S11). Thereafter, the door control device 100 determines whether the portable device 200 is present in the second imaging area A2 (S12). When the portable device 200 is not present in the second imaging area A2 (S12: NO), in other words, when the user carrying the portable device 200 is not present in the vicinity of the vehicle 10, the door control device 100 temporarily ends the process.

Meanwhile, when the portable device 200 is present in the second imaging area A2 (S12: YES), in other words, when the user carrying the portable device 200 is present in the vicinity of the vehicle 10, the door control device 100 activates the camera 70 (S13). At this time, it is preferable that when the surroundings of the vehicle 10 are dark to such an extent that it is not suitable for the cameras 70 to capture an image, the door control device 100 turns on the illumination device 80.

Thereafter, the door control device 100 acquires the position of the portable device 200 (S14). Subsequently, the door control device 100 determines whether the portable device 200 is present in the first imaging area A1 (S15). When the portable device 200 is present in the first imaging area A1 (S15: YES), the process performed by the door control device 100 proceeds to step S17. Meanwhile, when the portable device 200 is not in the first imaging area A1 (S15: NO), the door control device 100 adjusts the direction of the camera 70 such that the portable device 200 falls within the first imaging area A1 (S16). Thereafter, the process performed by the door control device 100 proceeds to step S17.

Subsequently, the door control device 100 sets the recognition area A3 with reference to the position of the portable device 200 (S17). For the door control device 100, setting the recognition area A3 means that the gesture operation of the user can be detected. Therefore, the door control device 100 may notify the user that the gesture operation of the user can be detected. Examples of the notification method include vibrating the portable device 200 and outputting sound from the portable device 200.

Then, the door control device 100 determines whether the gesture operation of the user is detected in the recognition area A3 (S18). When the gesture operation of the user is detected (S18: YES), the door control device 100 operates one of the doors 30 to be operated (S19). Thereafter, the door control device 100 stops the camera 70 (S20), and ends the process.

When the gesture operation is not detected in step S18 (S18: NO), the door control device 100 determines whether the portable device 200 is present in the second imaging area A2 (S21). When the portable device 200 is present in the second imaging area A2 (S21: YES), in other words, when the user carrying the portable device 200 moves around the vehicle 10, the process performed by the door control device 100 proceeds to step S14. Meanwhile, when the portable device 200 is not present in the second imaging area A2 (S21: NO), in other words, when the user carrying the portable device 200 leaves the vehicle 10, the door control device 100 stops the camera 70 (S22) and ends the process.

A function of the present embodiment will be described.

As shown in FIG. 1, a user who attempts to open the front door 31 approaches the front door 31 while carrying the portable device 200. Thereafter, the user executes a predetermined gesture operation. Then, the front door 31 is unlocked, and then is opened. At this time, the user only needs to execute the gesture operation in the imaging area of the side camera 71, and for example, it is not necessary to execute the gesture operation in front of the front door 31.

Effects of the first embodiment will be described.

(1) The door control device 100 operates the door 30 when the portable device 200 is present in the first imaging area A1 and the user executes the gesture operation. In other words, when the portable device 200 is not present in the first imaging area A1, the door control device 100 does not activate the doors 30 even when the user executes the gesture operation. Therefore, the door control device 100 can prevent the door 30 from being operated based on the gesture operation of the user who does not carry the portable device 200. For example, the door control device 100 can prevent the door 30 from being operated when erroneously determining the gesture operation by, for example, a movement of an object that is not the user around the vehicle 10. Therefore, the door control device 100 can prevent the door 30 from being erroneously operated.

(2) The door control device 100 sets the recognition area A3 in relation to a current position of the user carrying the portable device 200. In other words, the door control device 100 does not set the recognition area A3 in relation to the vehicle 10, such as a position of a front surface of the door 30. Therefore, the user can operate the door 30 by performing the gesture operation at any position. Therefore, the door control device 100 can improve convenience of the user. The door control device 100 determines whether the gesture operation of the user is executed in the narrow recognition area A3 instead of the wide imaging area. Therefore, the door control device 100 can reduce a possibility of erroneously detecting the gesture operation of the user.

(3) The door control device 100 can switch one of the doors 30 to be operated in accordance with the door 30 that the user approaches. That is, the user does not need to use a different gesture operation according to the one of the doors 30 to be operated. Therefore, the door control device 100 can improve the convenience of the user.

(4) The door control device 100 adjusts the direction of the camera 70. Therefore, the door control device 100 can set the recognition area A3 from a wider imaging area. In other words, the door control device 100 can expand an area in which the gesture operation of the user can be detected, as compared with a case where the direction of the camera 70 is fixed.

(5) When the surroundings of the vehicle 10 are dark, the image quality of the image captured by the camera 70 is likely to deteriorate. In this respect, regarding the door control device 100, since the surroundings of the vehicle 10 can be illuminated by the illumination device 80, even when the surroundings of the vehicle 10 are dark, the image quality of the image captured by the camera 70 is less likely to decrease. As a result, the door control device 100 can prevent an erroneous detection of the gesture operation of the user.

Second Embodiment

Figure 4:
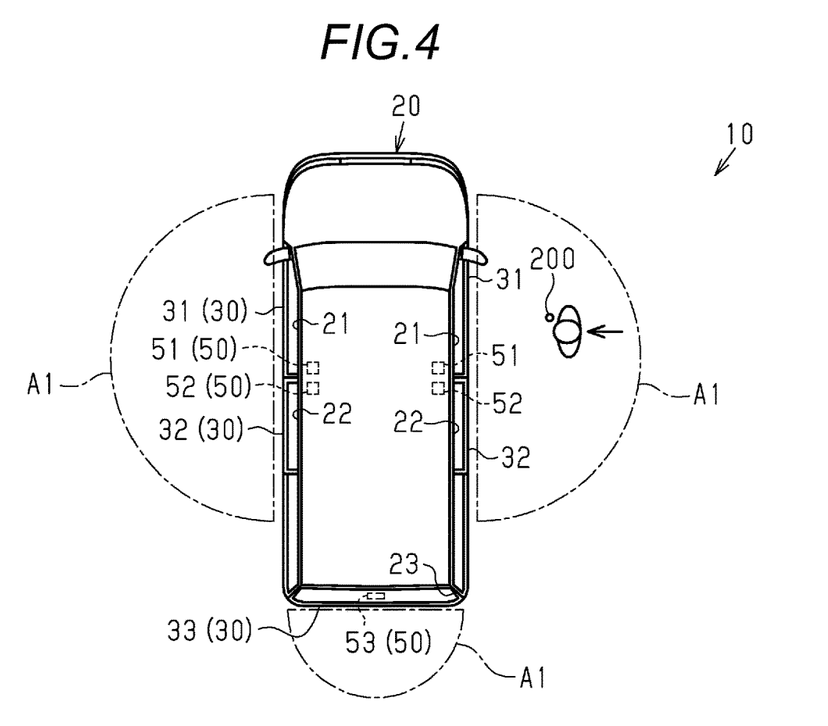
FIG. 4 is a schematic diagram of a vehicle including a door control device according to a second embodiment.
Figure 5:
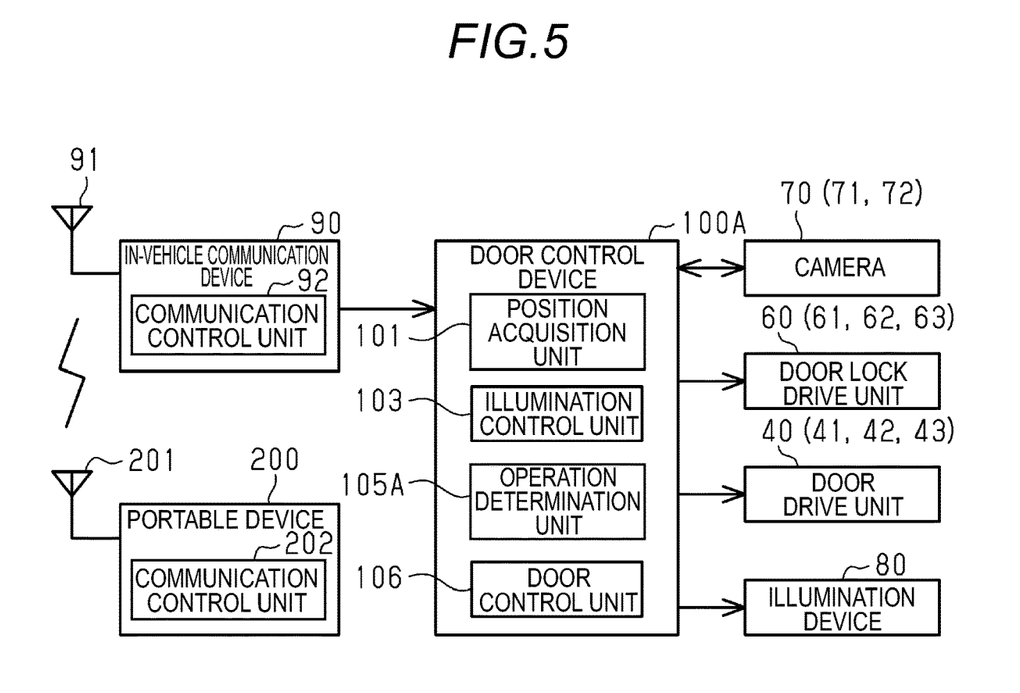
FIG. 5 is a block diagram showing a control configuration of the door control device according to the second embodiment.

Hereinafter, a door control device 100A according to a second embodiment will be described with reference to the drawings. In the second embodiment, the same components as those in the first embodiment are denoted by the same reference numerals, and the description the components is omitted. The door control device 100A according to the second embodiment is different from the door control device 100 in the first embodiment in that the door control device 100A does not include the camera control unit 102 and the area setting unit 104. In addition, a processing content of an operation determination unit 105A is different.

As shown in FIGS. 4 and 5, the door control device 100A includes the position acquisition unit 101, the illumination control unit 103, the operation determination unit 105A, and the door control unit 106.

In the second embodiment, the operation determination unit 105A determines whether the portable device 200 approaches the vehicle 10 as time elapses based on the position of the portable device 200 acquired by the position acquisition unit 101. Then, the operation determination unit 105A determines whether the user executes the gesture operation while the portable device 200 approaches the vehicle 10. The gesture operation executed by the user is a gesture operation that can be executed while walking. As an example, the gesture operation is an operation of maintaining a state where one hand is raised upward or maintaining a state where the hand is clasped. As described above, the operation determination unit 105A determines whether a part of a body of the user to be a target of the gesture operation moves only in a movement direction of the portable device 200, thereby determining whether the user executes the gesture operation while the mobile device 200 approaches the vehicle 10.

The operation determination unit 105A may specify a position of a hand of the user, for example, by using a learned model that has machine-learned. Here, the learned model is obtained by performing machine learning using teacher data in which an image captured in advance and the part of the body of the user are associated with each other.

In the second embodiment, the direction of the camera 70 cannot be adjusted. Therefore, a fixed imaging area is referred to as the "first imaging area A1".

Next, a flow of a process performed by the door control device 100A when the user attempts to activate the door 30 of the vehicle 10 that is stopped will be described with reference to a flowchart shown in FIG. 6. This process is performed after mutual authentication is completed between the in-vehicle communication device 90 and the portable device 200.

Figure 6:
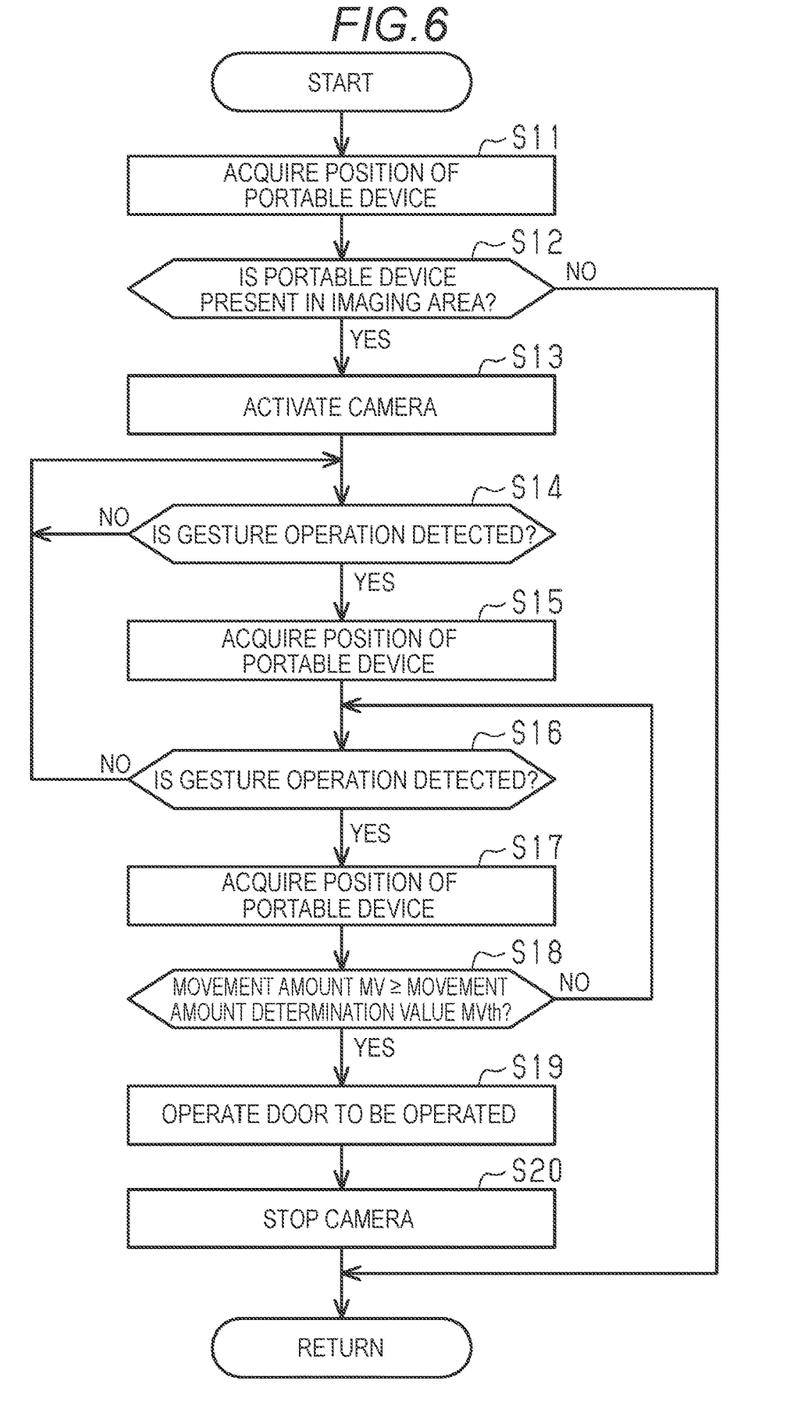
FIG. 6 is a flowchart showing a flow of a process performed by the door control device according to the second embodiment.

As shown in FIG. 6, the door control device 100A acquires the position of the portable device 200 by transmitting and receiving the signals in the UWB band between the in-vehicle communication device 90 and the portable device 200 (S11). Thereafter, the door control device 100A determines whether the portable device 200 is present in the first imaging area A1 (S12). When the portable device 200 is not present in the first imaging area A1 (S12: NO), in other words, when the user carrying the portable device 200 is not present in the vicinity of the vehicle 10, the door control device 100A temporarily ends the process. Meanwhile, when the portable device 200 is present in the first imaging area A1 (S12: YES), in other words, when the user carrying the portable device 200 is present in the vicinity of the vehicle 10, the door control device 100A activates the camera 70 (S13). At this time, it is preferable that when the surroundings of the vehicle 10 are dark to such an extent that it is not suitable to capture an image by the camera 70, the door control device 100A turns on the illumination device 80.

The door control device 100A determines whether the gesture operation of the user is detected (S14). When the gesture operation is not detected (S14: NO), the door control device 100A waits until the gesture operation is detected. Meanwhile, when the gesture operation is detected (S14: YES), the door control device 100A acquires the position of the portable device 200 (S15). Thereafter, the door control device 100A determines again whether the gesture operation of the user is detected (S16).

When the gesture operation is not continuously detected (S16: NO), the process performed by the door control device 100A proceeds to step S14. Meanwhile, when the gesture operation is continuously detected (S16: YES), the door control device 100A acquires the position of the portable device 200 (S17). Then, the door control device 100A determines whether a movement amount MV of the portable device 200 after an affirmative determination is made in step S14 is equal to or greater than a movement amount determination value MVth (S18).

Here, the movement amount MV is an amount indicating how much the user carrying the portable device 200 has approached the vehicle 10 while executing the gesture operation. It is preferable that the movement amount determination value MVth is set in advance between several tens of centimeters to several meters, for example. When the movement amount determination value MVth is reduced, an approach amount of the user to the vehicle 10 in a state where the user executes the gesture operation decreases, and thus the convenience of the user is improved. Meanwhile, when the movement amount determination value MVth is increased, the approach amount of the user to the vehicle 10 in a state where the user executes the gesture operation increases, and thus determination accuracy of the gesture operation increases. The movement amount MV takes a positive value when the user approaches the vehicle 10, and takes a negative value when the user moves away from the vehicle 10.

When the movement amount MV of the user is less than the movement amount determination value Myth, the process performed by the door control device 100A proceeds to step S16. However, it is preferable that the door control device 100A ends this process when the movement amount MV tends to decrease, that is, when the user leaves the vehicle 10. Meanwhile, when the movement amount MV of the user is equal to or greater than the movement amount determination value Myth, the door control device 100A actuates one of the doors 30 to be operated (S19). Thereafter, the door control device 100A stops the camera 70 (S20), and ends the process.

A function of the present embodiment will be described.

As shown in FIG. 1, the user who attempts to open the front door 31 approaches the front door 31 in a state where the user carries the portable device 200 and executes the gesture operation. Then, the front door 31 is unlocked, and then is opened.

Effects of the second embodiment will be described. The second embodiment can obtain the following effects in addition to the effects (1) and (3) of the first embodiment.

(6) When the user carrying the portable device 200 approaches the vehicle 10 while executing the gesture operation, the door control device 100A operates the door 30. Therefore, even when the door control device 100A erroneously determines that the user executes the gesture operation, the door control device 100A does not activate the door 30 unless the user approaches the vehicle 10. Therefore, the door control device 100A can prevent the door 30 from being erroneously operated.

The present embodiment can be modified and implemented as follows. The present embodiment and the following modifications can be implemented in combination with each other as long as the embodiment and the modifications do not have technical contradiction.

The door control devices 100 and 100A may activate the camera 70 after mutual authentication is completed between the in-vehicle communication device 90 and the portable device 200.

The door control devices 100 and 100A may determine whether the portable device 200 approaches the vehicle 10 based on a temporal change in the position of the portable device 200. Then, the door control device 100 may activate the door 30 when the door control device 100 determines that the user executes the gesture operation after the portable device 200 approaches the vehicle 10. The door control device 100 may activate the door 30 when the portable device 200 approaches the vehicle 10 after the door control device 100 determines that the user executes the gesture operation. That is, the determination of the approach of the portable device 200 with respect to the vehicle 10 and the determination of the execution of the gesture of the user may be at different timings.

When the door control device 100A determines the execution of the gesture operation of the user after determining the approach of the portable device 200 with respect to the vehicle 10, for example, an electrostatic sensor installed on a window glass of the door 30 can be used as the "detection device". In this case, the door control device 100A actuates the door 30 when the portable device 200 approaches the vehicle 10 and an electrostatic capacitance value of the electrostatic sensor changes by a predetermined value. That is, even when the electrostatic capacitance value of the electrostatic sensor changes by a predetermined value due to raindrops attached to the window glass of the door 30, the door control device 100A does not activate the door 30 unless the portable device 200 approaches the vehicle 10. Therefore, the door control device 100A can reduce a possibility of erroneously operating the door 30 as compared with a case where operation determination of the door 30 is performed using only the electrostatic sensor. A detection area of the electrostatic sensor in this case refers to a position of the user when a part of the body such as a hand can approach the electrostatic sensor.

In the second embodiment, the door control device 100A may determine one of the doors 30 to be operated based on an approaching direction of the portable device 200 with respect to the vehicle 10. For example, the door control device 100A may set the one of the doors 30 to be operated as the front door 31 when the front door 31 is present in the approaching direction of the portable device 200, and set the one of the doors 30 to be operated as the rear door 32 when the rear door 32 is present in the approaching direction of the portable device 200. Accordingly, the door control device 100A can operate the front door 31 when the user executes the gesture operation at a position closer to the back door 33 than the front door 31 in a situation where the user approaches the front door 31.

In the second embodiment, the door control device 100A may predict a route of the user based on the approaching direction of the portable device 200 with respect to the vehicle 10. In this case, the door control device 100A may restrict an opening operation of the front door 31 when the predicted route of the user and an operation trajectory during the opening operation of the front door 31 cross each other.

The first communication control unit 92 and the second communication control unit 202 may mutually authenticate each other using Wi-Fi or Bluetooth (registered trademark).

The first communication control unit 92 and the second communication control unit 202 may measure a distance between the in-vehicle communication device 90 and the portable device 200 using a Bluetooth Low Energy (BLE).

The illumination device 80 may be a headlight, a backlight, a room light, or the like provided in the vehicle 10.

One of the doors 30 to be operated may be another opening and closing body of the vehicle 10. For example, the opening and closing body may be a window glass of the door 30, a sunroof panel, or a fuel lid.

The door control devices 100 and 100A and the communication control units 92 and 202 may be configured as a circuit including one or more processors that operate in accordance with a computer program (software) and one or more dedicated hardware circuits such as a dedicated hardware (application specific integrated circuit: ASIC) that executes at least a part of various processes, or a combination thereof. The processor includes a CPU and a memory such as an RAM and an ROM. The memory stores program codes or instructions that cause the CPU to execute processing. The memory, that is a storage medium, includes any available medium that can be accessed by a general-purpose computer or a dedicated computer.

An opening and closing body control device is applied to a vehicle that includes a vehicle body having an opening, an opening and closing body configured to open and close the opening, a drive unit configured to operate the opening and closing body, and a detection device configured to detect a gesture operation of a user. The opening and closing body control device includes: a position acquisition unit configured to acquire a position of a portable device carried by the user by wireless communication; an operation determination unit configured to determine whether the gesture operation is executed in a situation where the portable device is present in a detection area of the detection device; and an opening and closing body control unit configured to operate the opening and closing body based on a content of the gesture operation when it is determined that the user executes the gesture operation.

The opening and closing body control device configured as described above operates the opening and closing body when the portable device is present in the detection area and the user executes the gesture operation. In other words, when the portable device is not present in the detection area, the opening and closing body control device does not operate the opening and closing body even when the user executes the gesture operation. Therefore, the opening and closing body control device can prevent the opening and closing body from being erroneously operated.

It is preferable that in the opening and closing body control device, the detection device is a camera, and the detection area is an imaging area of the camera, the opening and closing body control device further includes an area setting unit configured to set a recognition area narrower than the imaging area based on the position of the portable device, and the operation determination unit is configured to determine whether the gesture operation is executed in a situation where the portable device is present in the recognition area.

The opening and closing body control device configured as described above sets the recognition area in relation to a current position of the user carrying the portable device. In other words, the opening and closing body control device does not set the recognition area in relation to the vehicle, such as a position of a front surface of the opening and closing body. Therefore, the user can operate the opening and closing body by executing the gesture operation at any position. Therefore, the opening and closing body control device can improve convenience of the user.

It is preferable that in the opening and closing body control device, the detection device is a camera, and the detection area is an imaging area of the camera, and the operation determination unit is configured to determine whether the gesture operation is executed while the portable device approaches the vehicle.

The opening and closing body control device configured as described above operates the opening and closing body when the user carrying the portable device approaches the vehicle while executing the gesture operation. Therefore, even when the opening and closing body control device erroneously determines that the user executes the gesture operation, the opening and closing body control device does not operate the opening and closing body unless the user approaches the vehicle. Therefore, the opening and closing body control device can prevent the opening and closing body from being erroneously operated.

It is preferable that in the opening and closing body control device, the opening includes a first opening and a second opening that are opened at different positions in the vehicle body, the opening and closing body includes a first opening and closing body that opens and closes the first opening and a second opening and closing body that opens and closes the second opening, and the opening and closing body control unit is configured to operate the first opening and closing body based on the content of the gesture operation when the portable device is closer to the first opening and closing body than the second opening and closing body, and operate the second opening and closing body based on the content of the gesture operation when the portable device is closer to the second opening and closing body than the first opening and closing body.

The opening and closing body control device configured as described above can switch an opening and closing body to be operated according to the opening and closing body that the user approaches. That is, the user does not need to use a different gesture operation according to the opening and closing body to be operated. Therefore, the opening and closing body control device can improve the convenience of the user.

It is preferable that in the opening and closing body control device, the camera is configured to be adjustable in directions, and the opening and closing body control device further includes a camera control unit configured to adjust a direction of the camera such that the portable device is present in an imaging area when the portable device is not present in the imaging area.

The opening and closing body control device configured as described above can set the recognition area from the wider imaging area. In other words, the opening and closing body control device can expand an area in which the gesture operation of the user can be detected, as compared with a case where the direction of the camera is fixed.

It is preferable that in the opening and closing body control device, the vehicle includes an illumination device configured to illuminate surroundings of the vehicle, and the opening and closing body control device further includes an illumination control unit configured to control the illumination device according to brightness around the vehicle.

When the surroundings of the vehicle are dark, an image quality of an image captured by the camera is likely to deteriorate. In this respect, regarding the opening and closing body control device configured as described above, since the surroundings of the vehicle can be illuminated by the illumination device, even when the surroundings of the vehicle are dark, the image quality of the image captured by the camera is less likely to deteriorate. As a result, the opening and closing body control device can prevent an erroneous detection of the gesture operation of the user.

The opening and closing body control device configured as described above can prevent the opening and closing body from being erroneously operated.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An opening and closing body control device applied to a vehicle that includes a vehicle body having an opening, an opening and closing body configured to open and close the opening, a drive unit configured to operate the opening and closing body, and a camera configured to detect a gesture operation of a user, the opening and closing body control device comprising:
a position acquisition unit configured to acquire a position of a portable device carried by the user by wireless communication;
an operation determination unit configured to determine whether the gesture operation is executed in a situation where the portable device is present in a detection area which is an imaging area of the camera;
an opening and closing body control unit configured to operate the opening and closing body based on a content of the gesture operation when it is determined that the user executes the gesture operation; and
an area setting unit configured to set a recognition area narrower than the imaging area centered on the position of the portable device.

2. The opening and closing body control device according to claim 1, wherein
the operation determination unit is configured to determine whether the gesture operation is executed in a situation where the portable device is present in the recognition area.

3. The opening and closing body control device according to claim 2, wherein
the opening includes a first opening and a second opening that are opened at different positions in the vehicle body,
the opening and closing body includes a first opening and closing body that opens and closes the first opening and a second opening and closing body that opens and closes the second opening, and the opening and closing body control unit is configured to operate the first opening and closing body based on the content of the gesture operation when the portable device is closer to the first opening and closing body than the second opening and closing body, and operate the second opening and closing body based on the content of the gesture operation when the portable device is closer to the second opening and closing body than the first opening and closing body.

4. The opening and closing body control device according to claim 2, wherein the camera is configured to be adjustable in directions, and the opening and closing body control device further comprises a camera control unit configured to adjust a direction of the camera such that the portable device is present in the imaging area when the portable device is not present in the imaging area.

5. The opening and closing body control device according to claim 2, wherein the vehicle includes an illumination device configured to illuminate surroundings of the vehicle, and the opening and closing body control device further comprises an illumination control unit configured to control the illumination device according to brightness around the vehicle.

6. The opening and closing body control device according to claim 1, wherein the operation determination unit is configured to determine whether the gesture operation is executed while the portable device approaches the vehicle.

* * * * *